United States Patent [19]

Haubner

[11] 4,169,409
[45] Oct. 2, 1979

[54] FOOD PROCESSING EQUIPMENT

[76] Inventor: James W. Haubner, P.O. Box 1065, La Grande, Oreg. 97850

[21] Appl. No.: 893,702

[22] Filed: Apr. 5, 1978

[51] Int. Cl.² .............................................. A23N 7/01
[52] U.S. Cl. ........................................ 99/629; 99/634
[58] Field of Search ................ 99/629, 630, 632, 634; 366/341; 426/481, 482, 483

[56] References Cited

U.S. PATENT DOCUMENTS

| | | | |
|---|---|---|---|
| 1,307,692 | 6/1919 | Northrop | 99/629 |
| 2,041,111 | 5/1936 | Brown | 99/629 |
| 2,564,916 | 8/1951 | Nemir | 99/629 |
| 2,619,139 | 11/1952 | Riggle | 99/634 |
| 2,676,633 | 4/1954 | Lohre | 99/634 |

*Primary Examiner*—Edward J. McCarthy
*Attorney, Agent, or Firm*—Kolisch, Hartwell, Dickinson & Stuart

[57] ABSTRACT

Equipment for processing produce including a rotatable drum with outwardly facing pockets distributed circumferentially. The lower portion of the drum is submerged in a pool of liquid confined by a tank. Liquid is circulated in the tank to cause produce to travel into the pockets as the pockets move into the liquid pool with rotation of the drum, and to cause produce to travel out of the pockets as the pockets move out of the liquid pool.

9 Claims, 3 Drawing Figures

FOOD PROCESSING EQUIPMENT

The invention relates to produce processing equipment, and more particularly to such equipment where the produce is subjected to a treatment in liquid to perform a function such as to wash the produce, to peel the produce, to apply preservative over the produce, etc. The equipment specifically described herein constitutes what is known as a caustic peeler, which is equipment designed to submerge and tumble produce in a warm lye solution for the purpose of removing the skin from the produce.

A problem generally encountered in produce processing equipment is that produce such as fruit, tomatoes, walnuts, etc., is subject to bruising and other damage if improperly handled. Obviously, it is important from an economic standpoint that loss arising by reason of such damage is maintained at a minimum. Furthermore, it should be remembered that produce arrives at a processing plant with such having widely different sizes and shapes, and not infrequently mixed with rocks, dirt and other debris. Additional debris such as peeled skin may be produced by the operation of the equipment. Ideally therefore, processing equipment should be able to handle a wide variety of article sizes and shapes, and also should make provision for the removal of debris as such accumulates in the equipment.

Generally, an object of this invention is to provide improved produce processing equipment of the general type described, which is capable of handling produce with minimal bruising and other damage introduced.

Another object is to provide processing equipment which readily processes items of produce of widely differing sizes and shapes.

A more particular object of the invention is to provide such equipment which relies on the general buoyancy possessed by the usual produce for the handling of the produce in such a manner as to minimize mechanical damage thereto. Another feature of the equipment is that such may be readily provided with debris handling capability, whereby rocks, peeled skin, etc., are removed as such tend to accumulate in the equipment.

The equipment contemplated is relatively maintenance free in operation and requires little supervision.

These and other objects and advantages are obtained by the invention, which is described herein below in conjunction with the accompanying drawings, wherein:

FIG. 3 is a view taken along the line 3—3 in FIG. 1.

Figure 1:
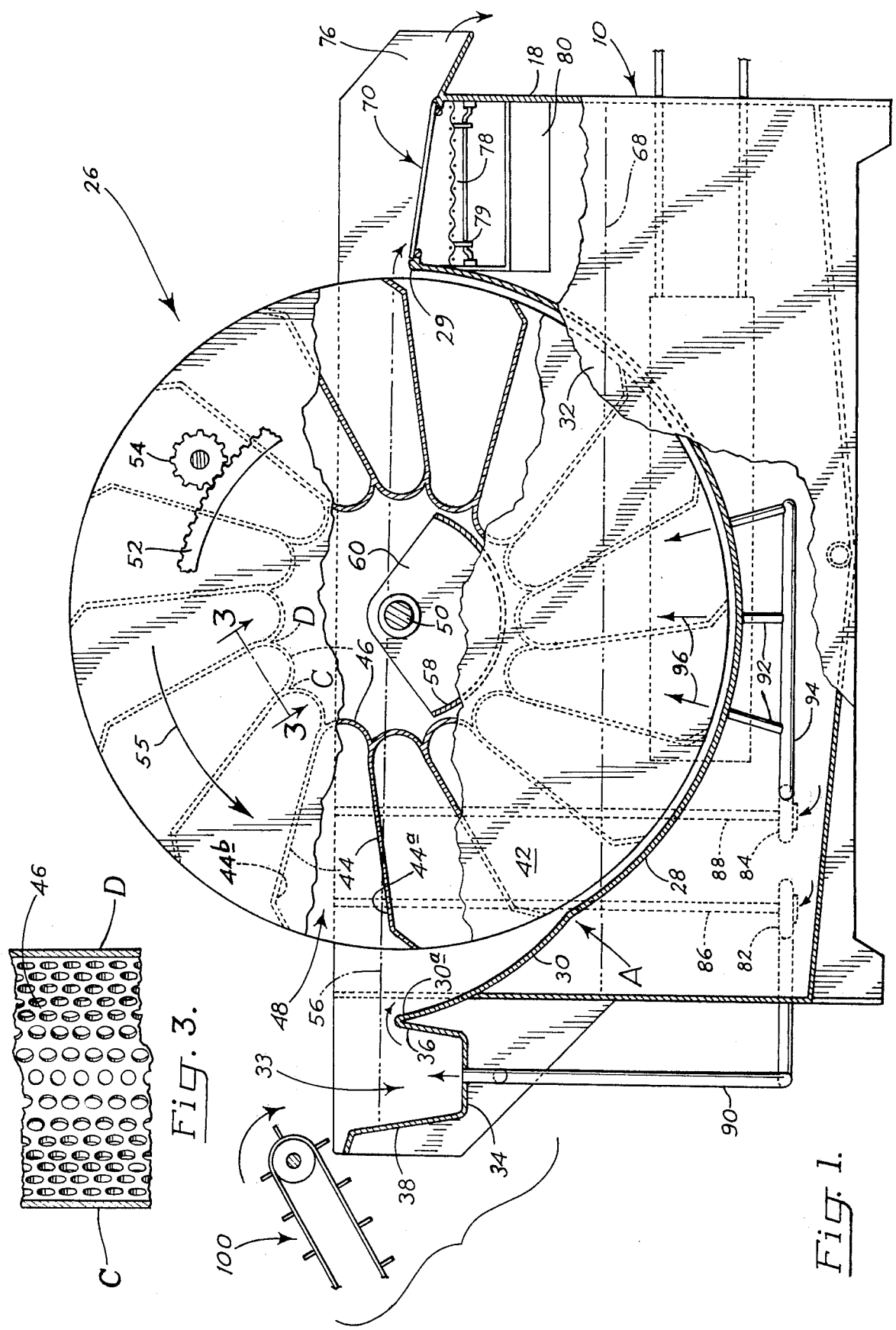
FIG. 1 is a side elevation, partly in cross-section, illustrating a so-called caustic peeler constructed according to an embodiment of the invention.

Referring now to the drawings, while the equipment of the invention may take several forms, in the particular embodiment of the invention pictured, there is shown casing structure 10 including upright side walls 12 and 14 and upright end walls 16 and 18 forming the sides and ends of a substantially rectangular reservoir for liquid, the latter having been given the general reference numberal 20. In a so-called caustic peeler, such liquid comprises an aqueous caustic solution. Bottoming reservoir 20 is a floor 22 which, if desired, may be provided with extremities that incline slightly progressing toward the center of the reservoir to promote draining of the reservoir. A drain line for the reservoir closeable by a conventional valve is shown at 24.

Casing structure 10 further includes wall structure forming a tank or tank means constructed to hold a pool of the processing liquid i.e. the caustic solution, with such submerging the lower portion of what is referred to herein as a drum shown at 26. Such wall structure includes a cylindrically curved expanse 28 extending under a bottom portion of the drum and in close adjacency to the periphery of the drum from a region generally indicated at A to a margin generally indicated at 29. Joining with this cylindrically curved expanse 28 is what is referred to as a deflector wall portion shown at 30. This deflector wall portion includes an upper margin 30a and extends downwardly from this upper margin in a curving expanse inclining toward the periphery of the drum progressing downwardly to region A where such integrally joins cylindrically curved expanse 28. Opposite sides of this tank or tank means are formed by wall 32 and wall 14 discussed in connection with reservoir 20.

The tank means which holds a pool of liquid submerging the lower part of drum 26 further includes wall structure forming a receiving trough 33 for produce. This structure includes a floor 34, a side wall 36 extending from the floor and joining with the deflector wall at upper margin 30a, and oppsed side wall 38.

Considering now in more detail the construction of the drum, such comprises a pair of opposed circular end plates 40, 42, forming ends of the drum. Extending between and suitably secured to these end plates are a multiplicity of blades 44. Curved expanses, such as the ones shown at 46, are joined to and interconnect adjacent pairs of the blades 44. In this way, there is provided in the drum a multiplicity of pockets distributed circumferentially thereon. Such pockets have open mouths facing outwardly on the drum, as exemplified by pocket 48 having a mouth facing outwardly and to the left in FIG. 1. A curved expanse 46 constitutes a base or bottom expanse for each pocket.

Drum 26 is rotatably mounted for rotation about a substantially horizontal axis. Specifically and in the particular embodiment of the invention shown, extending between the walls 14, 32 is a stationary shaft 50. Suitable bearings, rotatably support end plates 40, 42 on this shaft. The durm is rotated under power about the axis provided by shaft 50, with rotation occurring in a counterclockwise direction as the drum appears in FIG. 1, as indicated by the arrow shown.

The drum may be power driven in any suitable manner. Shown at 52 is a portion of a ring gear secured to end plate 42. A pinion gear 54 driven by a suitable motor (not shown) engages ring gear 52.

As will hereafter be discussed, during operation of the equipment a liquid level is maintained in the tank which surrounds the lower portion of drum 26. In FIG. 1, the level of the pool of liquid which is maintained in the tank is indicated by the dot-dash line 56.

It will be noted with reference to FIG. 1, that blades 44 are disposed at a slight angle with respect to a radius line extending outwardly from the axis of shaft 50. Considering each pocket on the drum, and with reference to pocket 48, surface 44a of the pocket constitutes a leading wall surface defining the pocket, and such enters the pool of liquid in the tank before surface 44b, which is referred to herein as a trailing wall surface.

With the pool of liquid in the tank having an established liquid level as indicated, and because of the incline in the drum blades, on rotation of the drum the radially outer extremity or margin of the trailing surface defining a pocket enters the pool of liquid before portions of the trailing surface disposed radially inwardly on the drum. As a consequence, a scooping action is produced, with produce items being processed which are floating in the liquid, tending to be scooped up and directly inwardly on a pocket as such advances downwardly into the pool. As the pocket further advances downwardly in the pool, such produce tends to rise upwardly in the pocket to concentrate adjacent the curved expanse which forms the base of the pocket. Any produce which is not picked up by a pocket is permitted, by the existence of the inclined deflector wall 30, to ride upwardly around the outside of the trailing surface of a pocket whereby such will not become pinched between a blade and the wall surface defining the tank. By the time a blade reaches the location of region A, produce has either freed itself and been buoyed upwardly to position likely to be caught by another pocket, or moved well into a pocket to be a substantial distance from the adjacent cylindrical curved expanse 28.

It will be noted with reference to FIG. 1, that the bottom expanses which form the bottoms of the pockets are located on the drum radially outwardly of the axis of the drum (which is the axis of shaft 50). Indicated at 58 is a cylindrically curved baffle which is secured on shaft 50 by means including web 60. The baffle has a length which is substantially coextensive with the width of the drum. The baffle is closely adjacent the arcuate path traveled by the bottom expanses of the pockets as the pockets are moved by rotation of the drum through the pool of liquid contained by the tank. The baffle is imperforate, and is used to control liquid movement as such is circulated, as will be described.

Figure 2:
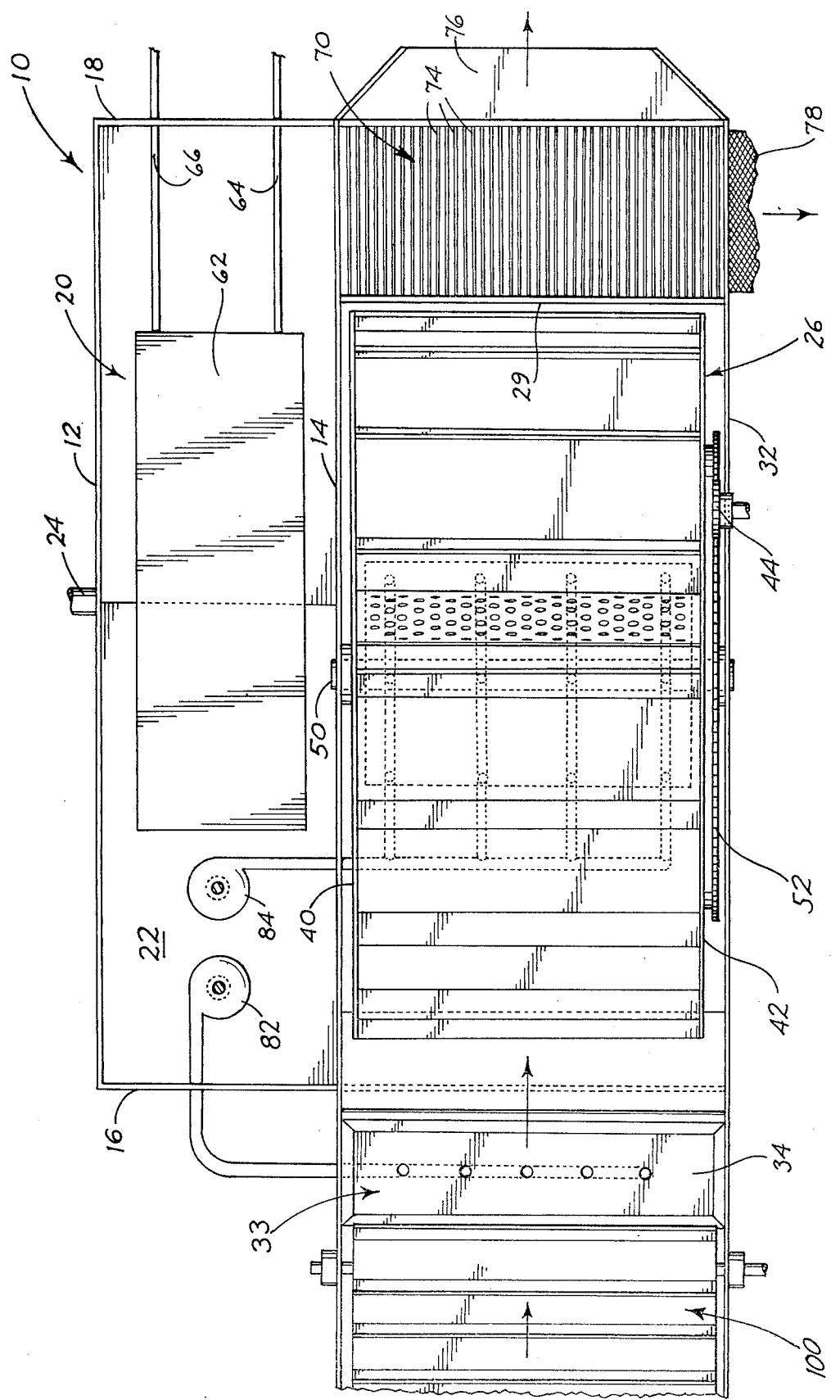
FIG. 2 is a plan view of the apparatus illustrating FIG. 1.

In a caustic peeler, the processing liquid i.e., the caustic soda solution, normally is heated to a temperature of 160° F. to 210° F. Such heating may be performed using any of a variety of conventional heaters. In the equipment illustrated, and referring to FIG. 2, heating of the solution is done with a steam heater shown in simplified form at 62 located in reservoir 20. Steam and condensate lines for this heater are shown at 64, 66. With the equipment operating, the level of lye solution in the reservoir may be as indicated by the dot-dash line 68, shown in FIG. 1, the liquid at such level submersing the steam heater.

Adjacent margin 29 of curved expanse 28 is a sloping grid 70 extending between the margin 29 and a wall 18 forming part of the framework of the equipment. The grid takes the form of multiple, parallel, spaced-apart bars 74 extending substantially normal to margin 29 and occupying a common inclined plane which slopes downwardly and to the right as the grid is viewed in FIG. 1. Produce leaving the pockets of the drum is deposited on this grid and such by gravity slides over the grid to be deposited in a chute 76. As will be further described, lye solution during operation of the equipment pours over margin 29 onto the grid, margin 29 thus functioning as a weir adjacent where the periphery of the drum moves out of the pool of liquid contained by the tank. Such lye solution or liquid drains through the grid, carrying with it debris such as the skins of the produce being processed. Such liquid cascades downwardly through a screen mechanism 78 which functions to screen the debris from the liquid, and onto a chute 80 which directs the now screened liquid back into reservoir 20. Screen mechanism 78 may be provided with oscillating means 79 whereby such is oscillated to advance material collecting thereon downwardly as the screen is viewed in FIG. 2, such motion serving to clean the screen and to eject the debris from the equipment.

Describing now the means provided in the equipment for circulating the lye solution, it will be observed that mounted within reservoir 20 are a pair of submerged pumps 82, 84. These pumps may be driven by any suitable means such as by power-driven shafts 86, 88 connected to the impellers of the respective pumps. Liquid enters pump 82 as indicated by the arrow associated with the pump in FIG. 1, and pumped via conduit 90 through floor 34 into trough 33.

Pump 84 is utilized to eject lye solution through jets 92 into the tank which holds the liquid submerging its lower part of the drum. Thus, the discharge of the pump is connected to the jets by conduit structure 94. Liquid discharged from the jets produces an upward current in the pool of liquid contained in the tank, as generally indicated by the arrows 96.

The liquid is pumped at a sufficient rate whereby a level of liquid is established approximating level 56 earlier described. With this level established, the caustic solution overflows the trough with margin 30a acting as a weir. Produce dropped into the trough, through the buoyancy thereof, rises to the surface of the liquid in the trough and is carried by the liquid over the weir into the main portion of the tank. On the opposite side of the drum from margin 30a, liquid cascades over margin 29 carrying with it any produce which at that time is carried by the particular pocket registering with the weir.

As can be seen in FIG. 3, curved expanses 46 forming the bottoms of the various pockets are perforate. In a unit which has been constructed, in the region between C and D of a pocket, perforations are provided which open up approximately 50% of the expanse. Such perforations accommodate the movement of caustic solution from left to right in FIG. 1, and into a pocket as such advances into the liquid in the region of trough 33, and further promotes the flow of lye solution from left to right and out of a pocket as such pocket moves into registry with margin 29 adjacent grid 70. Baffle 58 described tends to impede movement of liquid through the perforations of a pocket with such pockets moving along the base of the tank. With such movement impeded, jets 92 earlier described tend to produce a circulatory movement of liquid in the pockets moving over the jets promoting a tumbling of the produce which may be carried within such pockets.

In the usual instance, the drum desribed will be rotated at a relatively slow speed. By way of example, in a lye peeler, a residence time for potatoes within the lye solution may be utilized which is within the range of 4 to 8 minutes. It is an easy matter to change this resonance time merely by speeding up or slowing down the speed at which the drum rotates.

A conveyor is shown at 100 which is utilized to convey produce into the equipment and deposit such into trough 33. The produce drops only a short distance before dropping into the liquid or caustic solution which is within the trough. The manner selected for depositing the produce in the equipment results in minimal damage to the produce.

Rocks and smilar debris which may be carried on the conveyor together with the produce dumped into trough 33 and collect on the floor 34 of the trough. It is a relatively simple matter periodically to remove such articles from the trough after such collect in the trough.

The equipment described is relatively maintenance free, and can be operated over relatively long periods of time with minimal supervision.

While a particular embodiment of the invention has been described herein, it is obvious that modifications and variations are possible as would be apparent to one skilled in the art.

It is claimed and desired to secure by letters patent:

1. Produce processing equipment comprising
   a drum rotatable about a substantially horizontal axis having pockets distributed circumferentially thereon which pockets have open mouths facing outwardly on the drum, and powered means for rotating said drum,
   tank means constructed to hold a pool of liquid with such submerging a lower portion of said drum, the periphery of the drum on rotation of the drum moving into and out of such pool,
   said tank means including means forming a weir adjacent where the periphery of the drum moves out of such pool, and
   means for circulating liquid through said tank means with such pool during circulating of the liquid having a liquid level established by said weir, said means for circulating liquid producing a current of liquid which flows through a pocket and over said weir with the pocket positioned with its mouth opposite the weir.

2. Produce processing equipment comprising:
   a drum rotatable about a substantially horizontal axis having pockets distributed circumferentially thereon which pockets have open mouths facing outwardly on the drum, and powdered means for rotating said drum,
   tank means constructed to hold a pool of liquid with such submerging a lower portion of said drum, the periphery of the drum on rotation of the drum moving into and out of such pool,
   said tank means including means forming a weir adjacent where the periphery of the drum moves out of such pool,
   means for circulating liquid through said tank means with such pool during circulating of the liquid having a liquid level established by said weir, said means for circulating liquid producing a current of liquid which flows through a pocket and over said weir with the pocket positioned with its mouth opposite the weir,
   said pockets having leading and trailing wall surfaces defining them and a trailing surface moving into the pool of liquid after the leading surface on rotation of the drum, each trailing surface having a shape such that on rotation of the drum the radially outer extremity of the surface enters the pool with such at its established level before portions of the trailing surface dispose radially inwardly on the drum.

3. The processing equipment of claim 1, wherein said tank means further include a deflector wall which is adjacent and located radially outwardly from the drum where such is submerged in said pool, said deflector wall having a margin located adjacent where the drum moves into said pool and including an expanse which extends from said margin, said expanse inclining toward the periphery of said drum progressing in the direction of rotation of the drum.

4. The processing equipment of claim 2, wherein said pockets further include bottom expanses joining leading and trailing wall surfaces in the pockets, said bottom expanses being perforate to accomodate the flow of liquid therethrough.

5. The processing equipment of claim 1, wherein said means for circulating liquid includes means for directing liquid into said pcokets located adjacent the periphery of the drum on the underside of the drum.

6. The processing equipment of claim 4, wherein the bottom expanses of said pockets are located on the drum radially outwardly of the axis of the drum, said bottom expanses of said pockets on rotation of the drum moving through said pool of liquid, and which further comprises a baffle spaced radially inwardly from but adjacent the bottom expanses of said pockets during their movement through said pool of liquid.

7. Produce processing equipment comprising:
   a drum rotatable about a substantially horizontal axis having pockets distributed circumferentially thereon which pockets have open mouths facing outwardly on the drum, and powered means for rotating said drum,
   tank means constructed to hold a pool of liquid with such submerging a lower portion of said drum, the periphery of the drum on rotation of the drum moving into and out of such pool,
   said tank means including means forming a weir adjacent where the periphery of the drum moves out of such pool,
   means for circulating liquid through said tank means with such pool during circulating of the liquid having a liquid level established by said weir,
   said pockets having perforate wall surfaces defining them and said means for circulating liquid producing a current of liquid which flows through a pocket and out of the mouth of a pocket and over said weir with the pocket positioned with its mouth opposite the weir.

8. Produce processing equipment comprising:
   a drum rotatable about a substantially horizontal axis having pockets distributed circumferentially thereon which pockets have open mouths facing outwardly on the drum, and powered means for rotating said drum,
   tank means constructed to hold a pool of liquid with such submerging a lower portion of said drum, the periphery of the drum on rotation of the drum moving into and out of such pool,
   said tank means including means forming a weir adjacent where the periphery of the drum moves into such pool, and means forming a trough adjacent said weir for holding liquid,
   means for ciruclating liquid with such liquid filling said trough and flowing over said weir thence to form said pool of liquid which submerges the lower portion of the drum,
   said pockets having leading and trailing wall surfaces defining them and a trailing surface moving into the pool of liquid after the leading surface on rotation of the drum, each trailing surface having a shape such that on rotation of the drum the radially outer extremity of the surface enters the pool of liquid submerging the drum before portions of the trailing surface dispose radially inwardly on the drum.

9. The processing equipment of claim 8, wherein said tank means further includes a deflector wall which is adjacent and located radially outwardly from the drum where such is submerged in said pool, said deflector wall extending from said weir in an expanse which inclines toward the periphery of the drum progressing in the direction of rotation of the drum.

* * * * *